United States Patent [19]

Yahagi et al.

[11] Patent Number: 5,017,755
[45] Date of Patent: May 21, 1991

[54] METHOD OF REPAIRING LIQUID CRYSTAL DISPLAY AND APPARATUS USING THE METHOD

[75] Inventors: Susumu Yahagi; Shuichi Ishida, both of Yokohama; Shigeru Fujimoto, Himeji, all of Japan

[73] Assignee: Kabushiki Kaisha Toshiba, Kawasaki, Japan

[21] Appl. No.: 424,695

[22] Filed: Oct. 20, 1989

[30] Foreign Application Priority Data

Oct. 26, 1988 [JP] Japan .................................. 63-27023
Aug. 9, 1989 [JP] Japan .................................. 1-204757

[51] Int. Cl.$^5$ ............................................ B23K 26/00
[52] U.S. Cl. ......................... 219/121.68; 219/121.75; 219/121.76; 219/121.78; 219/121.82; 219/121.83
[58] Field of Search ....................... 219/121.67, 121.68, 219/121.69, 121.72, 121.76, 121.6, 121.85, 121.73, 121.75, 121.83, 121.78, 121.79, 121.82

[56] References Cited

U.S. PATENT DOCUMENTS 3,947,093 3/1976 Gashima et al. ................ 219/121.75
3,972,599 8/1976 Engel et al. ................. 219/121.74 X
4,190,759 2/1980 Hongo et al. .................. 219/121.68

FOREIGN PATENT DOCUMENTS 59-67580 4/1984 Japan .

OTHER PUBLICATIONS

Technical Paper IMC 1988 Proceedings, Tokyo, May 25–27, 1988, Application of a Xenon Laser in Microelectronics and Liquid Crystal Displays—by Vu Tran.

Primary Examiner—C. L. Albritton
Attorney, Agent, or Firm—Oblon, Spivak, McClelland, Maier & Neustadt

[57] ABSTRACT

An apparatus for repairing a liquid crystal display comprises a common electrode, pixel electrodes facing the common electrode, and a liquid crystal sealed between the common and pixel electrodes. If the liquid crystal contains foreign matter which short-circuits the common and pixel electrodes to each other, a pixel electrode is irradiated with a laser beam such that at least a ring line region completely surrounding a portion touching the foreign matter is burnt away, whereby a region inside of the ring line region and a region outside of the ring line region are electrically insulated from each other.

4 Claims, 4 Drawing Sheets

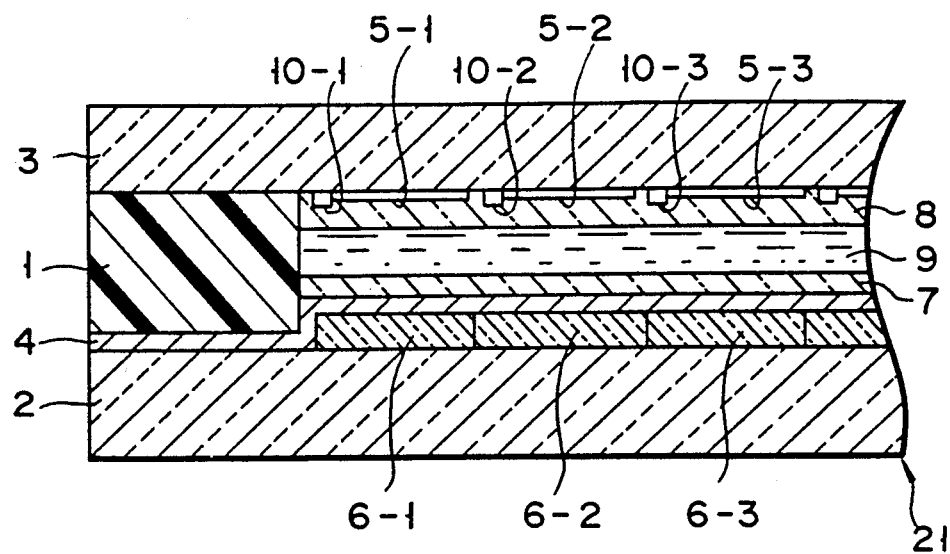
F I G. 2
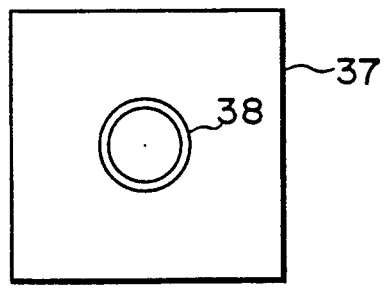
F I G. 3
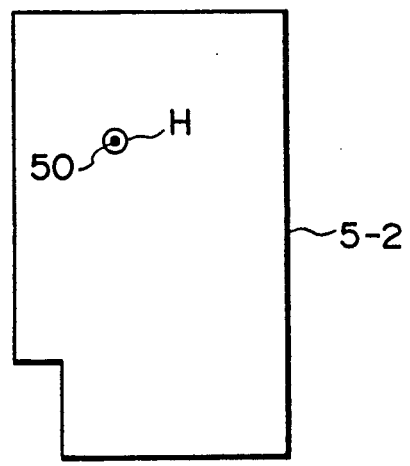
F I G. 4

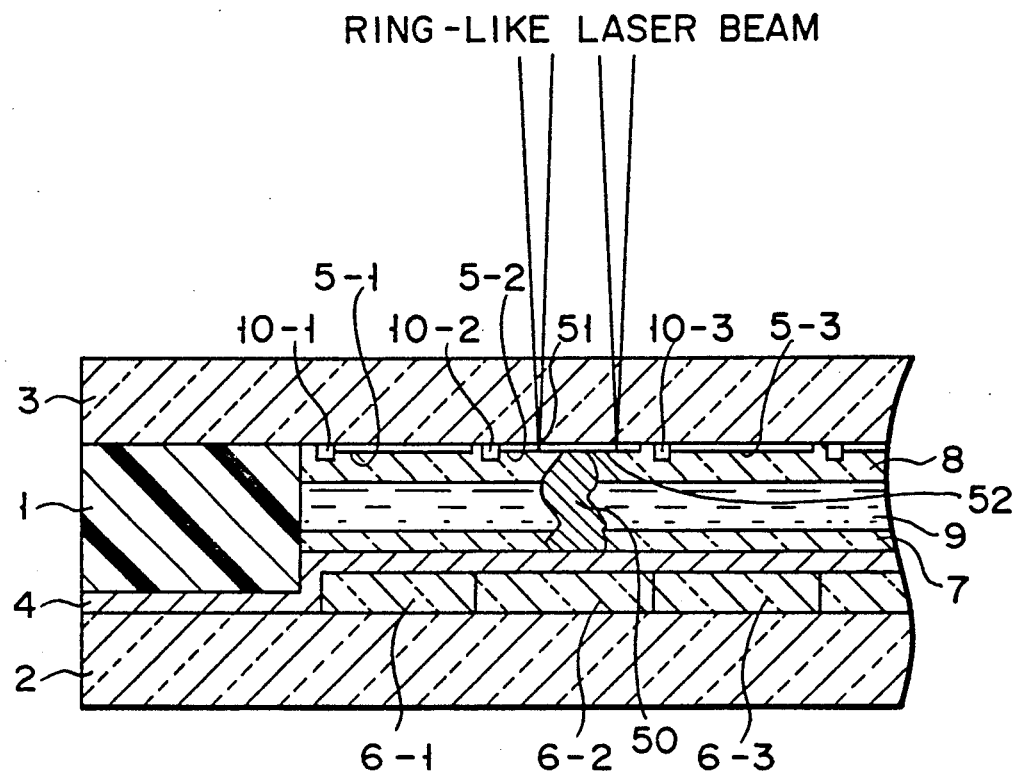
F I G. 5
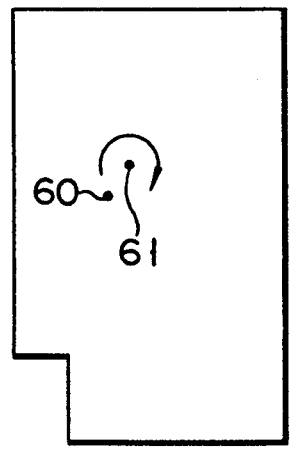
F I G. 6

METHOD OF REPAIRING LIQUID CRYSTAL DISPLAY AND APPARATUS USING THE METHOD

BACKGROUND OF THE INVENTION

1. Field of the Invention

The present invention relates to a method of repairing a foreign matter-containing liquid crystal display by utilizing a laser beam, and an apparatus using the method.

2. Description of the Related Art

A liquid crystal display is made up of a common electrode, pixel electrodes facing the common electrode, and liquid crystal sealed between the common electrode and the pixel electrodes. During the manufacturing process of a liquid crystal display, it may happen that electrically-conductive foreign matter is included in the liquid crystal when this liquid crystal is sealed between the common electrode and the pixel electrodes. If the liquid crystal contains foreign matter, the pixel electrode in contact with the foreign matter will be short-circuited to the common electrode. As a result, the liquid crystal display will not operate in response to the ON/OFF operation of a transistor, so that light will be always transmitted through the pixel portions of the pixel electrode which is in contact with the foreign matter.

SUMMARY OF THE INVENTION

One object of the present invention is to provide a method of reliably repairing, by use of a laser beam, a liquid crystal display wherein the common electrode and pixel electrodes are short-circuited to each other, due to electrically-conductive foreign matter included in the liquid crystal.

Another object of the present invention is to provide an apparatus for reliably repairing, by use of a laser beam, a liquid crystal display wherein the common electrode and pixel electrodes are short-circuited to each other due to electrically-conductive foreign matter included in the liquid crystal.

According to the method of the present invention a laser beam is applied to a pixel electrode in a form of a ring line completely surrounding that part of the pixel electrode which is in contact with foreign matter, to thereby electrically insulate the portion inside the ring line from the portion outside the ring line.

According to the present invention, there is provided an apparatus for repairing a liquid crystal display which comprises: a laser oscillator for generating a laser beam; an alignment beam source for emitting an alignment beam used for the alignment of the laser beam generated by the laser oscillator; a first optical system for defining the laser and alignment beams in the form of ring-like beams; an XY table adapted to support a liquid crystal display mounted thereon and movable in an XY plane; a driving unit for driving the liquid crystal display; a second optical system for focusing the laser and alignment beams, which are defined in the form of ring-like beams, on a predetermined portion of the liquid crystal display; an illuminating unit for illuminating the liquid crystal display by directing light to the liquid crystal display through the second optical system; an image sensor for image-picking up the liquid crystal display through the second optical system; and a monitor television set for displaying an image corresponding to the picture signals obtained by the image sensor, the monitor television set being employed for the purpose of detecting an electrode which is in contact with conductive foreign matter.

In the above apparatus, the alignment beam emitted from the alignment beam source is defined in such a manner as to become a ring-like beam, and is then directed to the liquid crystal display by the beam-focusing optical system. In this condition, the liquid crystal display is image-picked up and its image is displayed on the monitor television set. When the alignment beam is directed to the liquid crystal display, it is positioned such that it surrounds foreign matter contained in the liquid crystal display. Thereafter, the laser beam emitted from the laser oscillator is directed to the liquid crystal display, via the same optical path as that of the alignment beam. As a result, the portion which is in contact with the foreign matter and is surrounded by the alignment beam is electrically insulated from the other portions of the liquid crystal display.

BRIEF DESCRIPTION OF THE DRAWINGS

FIG. 2 is a view showing the construction of a liquid crystal display;

FIG. 3 is a view of the slit plate employed in the apparatus shown in FIG. 1;

FIG. 4 is a sketch showing the position of an electrode to be eliminated by the apparatus;

FIG. 5 is a sketch showing one possible manner in which the electrode is eliminated by the apparatus;

FIG. 6 is a sketch showing another possible manner in which the electrode is eliminated by the apparatus;

DETAILED DESCRIPTION OF THE PREFERRED EMBODIMENTS

Figure 1:
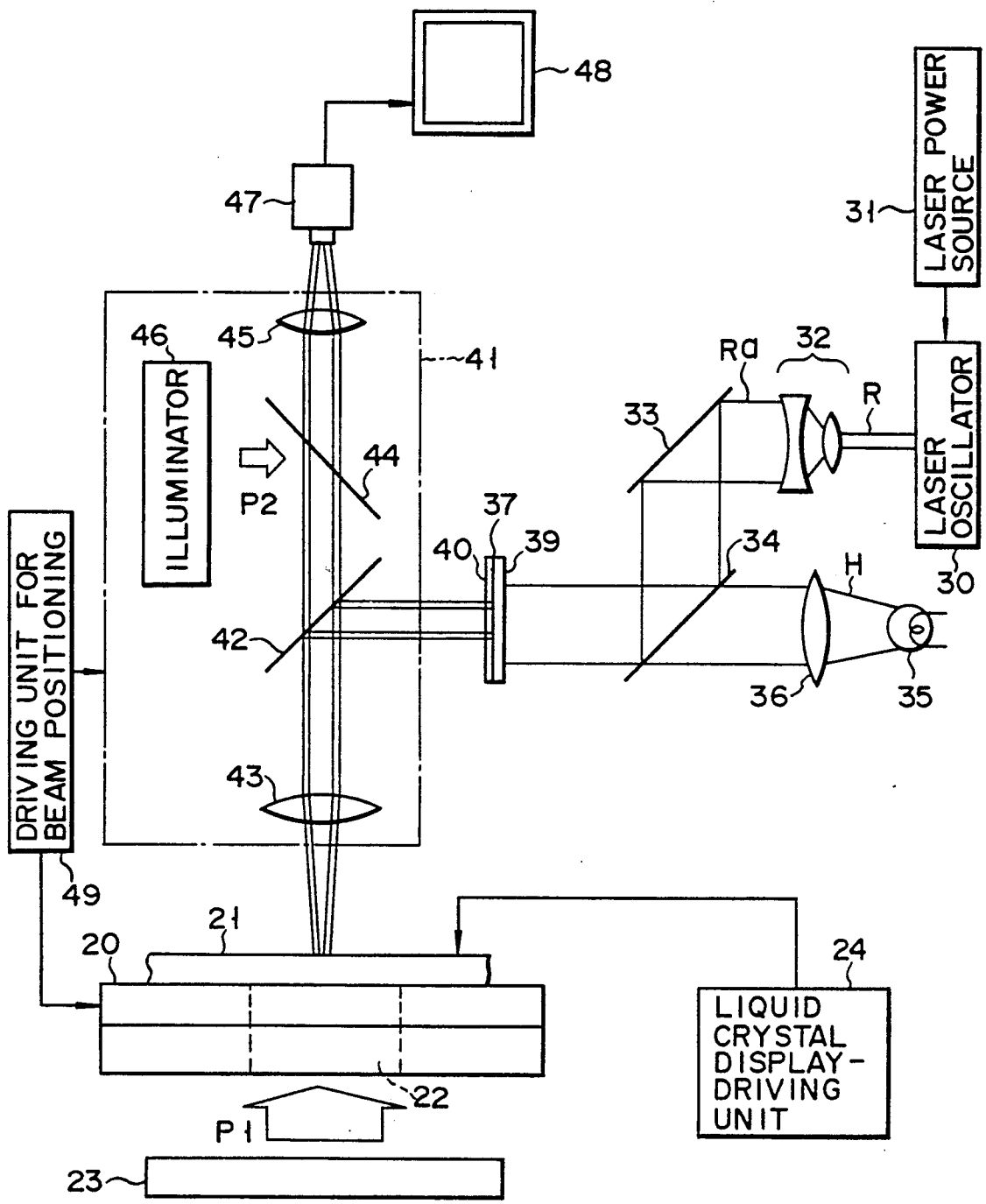
FIG. 1 is a diagram showing the arrangement of a liquid crystal display-repairing apparatus according to one embodiment of the present invention.

As is shown in FIG. 1, liquid crystal display 21 is mounted on XY table 20. This liquid crystal display has a construction such as that shown in FIG. 2. Referring to FIG. 2, liquid crystal display 21 comprises spacer 1 serving as a support member. Translucent glass substrates 2 and 3 are arranged in such a manner as to face each other. Common electrode is located between glass substrates 2 and 3, with its one end clamped between spacer 1 and glass substrate 2. A plurality of pixel electrodes 5-1, 5-2 ... are arranged on glass substrate 3 such that they face common electrode 4. A plurality of color filters 6-1, 6-2 ..., each having one of the three fundamental colors, are arranged between common electrode 4 and glass substrate 2 such that they correspond in location to pixel electrodes 5-1, 5-2 ..., respectively. Located between common electrode 4 and pixels 5-1, 5-2 ... are orientation films 7 and 8 spaced from each other by a predetermined distance. Liquid crystal 9 is sealed between orientation films 7 and 8. Thin film transistors 10-1, 10-2 ... are attached on glass substrate 3. Liquid crystal 9 is supported by use of resin containing fine glass particles, and has a thickness of 5 to 6 μm.

To show a color image on liquid crystal display 21, light Q is made to fall on liquid crystal 9 through glass substrate 3. In this state, a voltage is applied between common electrode 4 and given ones of pixel electrodes 5-1, 5-2 . . .. As a result, the light rays having the wavelengths determined by color filters 6-1, 6-2 . . . are transmitted through the pixels corresponding to the given pixel electrodes.

As is shown in FIG. 1, XY table 20 has hole 22 formed in the center thereof, and transmitted-illumination unit 23 is located under XY table 20. White light P1 emitted from back-light illumination unit 23 is directed to liquid crystal display 21 via hole 22. Liquid crystal display 21 is driven, with thin film transistors 10-1, 10-2 . . . selectively turned on or off by liquid crystal display-driving unit 24.

Laser oscillator 30 is a YAG laser oscillator which emits laser beam R used for working materials. This laser oscillator is supplied with power by laser power source 31. Optical lens system 32 is arranged in the optical path of laser beam R emitted from laser oscillator 30. This optical lens system serves to convert laser beam R into collimated laser beam Ra, which has a diameter larger than that of laser beam R. Mirror 33 is arranged in the optical path located at the output end of optical lens system 32. Laser beam Ra output from optical lens system 32 is reflected by mirror 33 and is therefore directed to beam splitter 34.

Light source 35 is an alignment beam source which emits white light H serving as an alignment beam. White light H emitted from light source 35 is converted by optical lens 36 into a collimated white light beam having an increased diameter, and is then guided to beam splitter 34. After being output from beam splitter 34, laser beam Ra and white light beam H travel in the same optical path. Slit plate 37 is arranged in the optical path to which laser beam Ra and white light beam H output from beam splitter 34 are directed. As is shown in FIG. 3, slit plate 37 has ring slit 38 formed therein. To be more specific, slit plate 37 is made up of glass substrate 39, and metal 40 which is coated on substrate 39 in such a manner as to form ring slit 38. Normally, a plurality of slit plates respectively having ring slits of different diameters are prepared.

After passing through ring slit 38 of slit plate 37, laser beam Ra and white light beam H are guided to beam-focusing optical system 41. This optical system converges both laser beam Ra and white light beam H and focuses them on the same portion of liquid crystal display 21. More specifically, beam-focusing optical system 41 is constituted by a microscope, which includes dichroic mirror 42 and converging lens 43 located in the optical path of the light reflected by dichroic mirror 42. Laser beam Ra and white light beam H are first reflected by dichroic mirror 42 and are then converged by converging lens 43. In the optical path connecting between dichroic mirror 42 and converging lens 43, beam splitter 44 and focusing lens 45 are arranged in series. Illuminator 46 is arranged at a location branching from beam splitter 44. Therefore, light P2 emitted from illuminator 46 is first reflected by beam splitter 44, and is then directed to liquid crystal display 21 through dichroic mirror 42 and converging lens 43. The light reflected by liquid crystal display 21 passes through converging lens 43, dichroic mirror 42, and beam splitter 44, and is guided to focusing lens 45.

An image sensor, for example, CCD (charge-coupled device) camera 47 is located at the focal position of focusing lens 45, to pick up the image of light crystal display 21 through optical system 41. Image signals output from CCD camera 47 are supplied to monitor television set 48.

Driving unit 49, used for positioning of the beams, causes relative movement between XY table 20 and beam-focusing optical system 41. By utilization of this relative movement, laser beam Ra and white light beam H output from beam-focusing optical system 41 are positioned on a defective portion of liquid crystal display 21 such that their beam rings surround the defective portion. The operator performs this operation while observing the beam rings through monitor television set 48.

A description may now be given of the repairing operation performed by use of the above-mentioned apparatus.

After manufactured, liquid crystal display 21 is inspected. If a defect caused by inclusion of foreign matter to liquid crystal display 21 is found in this inspection, liquid crystal display 21 is mounted on XY table 20 such that it is located under beam-focusing optical system 41. In this condition, illuminator 46 emits light beam P2 to beam splitter 44. This light beam is reflected by beam splitter 44, passes through both dichroic mirror 42 and converging lens 43, and then falls on liquid crystal display 21. At the time, CCD camera 47 image-picks up liquid crystal display 21 through dichroic mirror 42, beam splitter 44 and beam-focusing lens 45. The image signals output from CCD camera 47 are supplied to monitor television set 48, which displays an image corresponding to the image signals.

In the meantime, liquid crystal display 21 is irradiated with white light beam Pl emitted from back-light illumination unit 23 and is driven by liquid crystal display-driving unit 24.

On monitor television set 48, an image of liquid crystal display 21 is displayed. In this state, XY table 20 is driven in the XY plane by driving unit 49.

Therefore, different portions of liquid crystal display 21 are sequentially shown on monitor television set 48 in accordance with the movement of XY table 20. While observing liquid crystal display 21 shown on monitor television set 48, the operator searches the defective portion of liquid crystal display 21. When the location of the defective portion is detected, light source 35 is turned on, to thereby emit white light beam H used for alignment. White light beam H is converted into a collimated beam having a larger diameter, and is guided to slit plate 37 through beam splitter 34. When white light beam H passes through ring slit 38, it is defined as a ring-like white light beam. The ring-like white light beam is guided to beam-focusing optical system 41. In this optical system, ring-like white light beam H is reflected by dichroic mirror 42, is converged by converging lens 43, and is made to fall on liquid crystal display 21. Liquid crystal display 21 mounted on XY table 20 is moved in the XY plane, with ring-like white light beam H falling thereon, until ring-like white light beam H surrounds foreign matter 50, as is shown in FIG. 4. It should be noted that the diameter of the ring-like white light beam falling on liquid crystal display 21 is determined by slit plate 37 to be employed.

When foreign matter 50 is surrounded by ring-like white light beam H, laser beam R is output by laser oscillator 30. By optical lens system 32, laser beam R is converted into collimated laser beam Ra whose diameter is larger than that of laser beam R. Laser beam Ra is reflected by both mirror 33 and beam splitter 34, and is then guided to slit plate 37. When laser beam Ra passes through ring slit 38 of slit plate 37, it is defined as a ring-like laser beam. The ring-like laser beam, thus obtained, is guided to beam-focusing optical system 41. In this optical system, the ring-like laser beam is reflected by dichroic mirror 42, is converged by converging lens 43, and is made to fall on liquid crystal display 21. The location on which the ring-like laser beam falls is the same as that on which white light beam H falls.

The state in which the ring-like laser beam falls on liquid crystal display 21 is illustrated in FIG. 5 in an enlarged scale. As is shown in FIG. 5, the ring-like laser beam is focused on pixel electrode 5-2 of liquid crystal display 21. As a result, annular region 51 which is irradiated with the ring-like laser beam is burnt away, in other words, removed from pixel electrode 5-2. Small region 52 located inside of annular region 51 is electrically insulated from the region located outside of annular region 52. Even when liquid crystal display-driving unit 24 does not apply any voltage between common electrode 4 and pixel electrode 5-2, a voltage is applied between small region 52 of pixel electrode 5-2 and common electrode 4. Although white light P2 emitted from back-light illumination unit 23 toward liquid crystal display 21 passes through small region 52 and its corresponding region of color filter 6-2, this does not causes any problem in practice, since the area of region 52 is very small; it is less than one tenth of the area of one pixel.

As mentioned above an annular region surrounding that part of pixel electrode 5-2 which contacts foreign matter 50 is removed in such a manner that small region 52 is electrically insulated from the other regions. Therefore, even if foreign matter 50 enters liquid crystal 9, it is possible to reduce the area of that portion of a pixel electrode which is made defective by foreign matter 50. Even a liquid crystal display which is regarded as defective due to inclusion of foreign matter can be repaired and used as a commercial product. Therefore, the manufacturing yield of liquid crystal displays can be improved.

Figure 7:
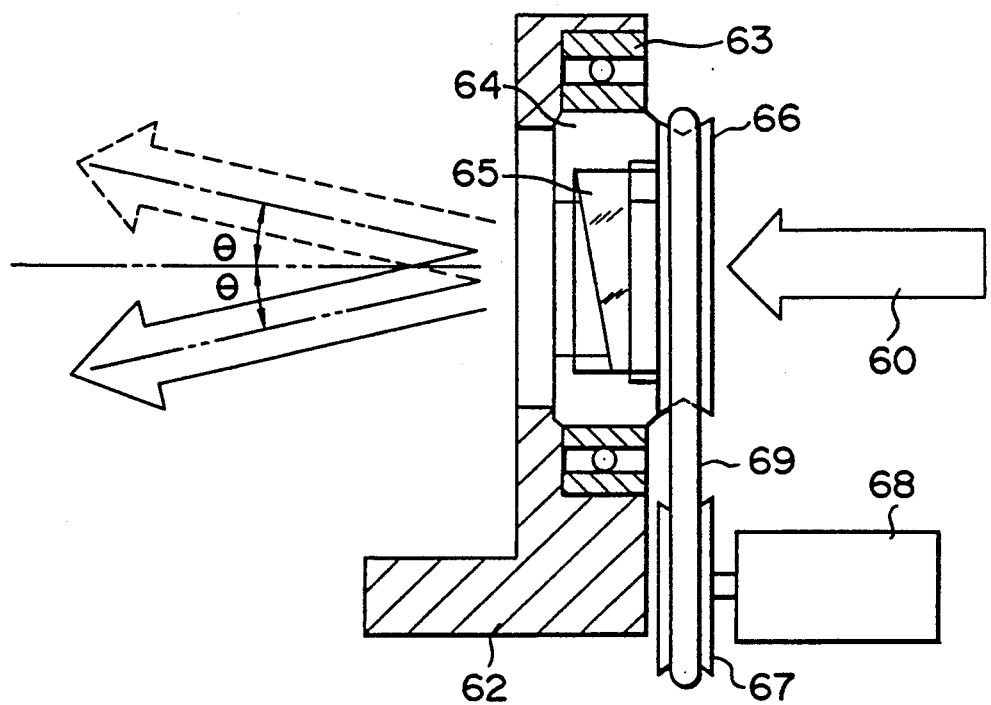
FIG. 7 is a diagram showing the construction of a scanning device for eliminating the electrode in the manner shown in FIG. 6, the scanning device using a spot laser beam.

The present invention is not limited to the embodiment mentioned above. It can be modified in various manners without departing from the spirit and scope of the invention. For instance, an annular region located around foreign matter can be removed by scanning it with laser beam spot 60 in the direction indicated in FIG. 6. In this fashion as well, a portion which is short-circuited due to inclusion of foreign matter can be electrically insulated from the other portions. When laser beam spot 60 is utilized, the scanning apparatus shown in FIG. 7 can be employed. As is shown in FIG. 7, the scanning apparatus comprises housing 64 rotatably attached to base 62 by bearings 63. Prism 65 is held by housing 64. Pulley 66 is fixed to housing 64, and motor 68 is provided in the vicinity of pulley 66. Pulley 67 is attached to the rotatable shaft of motor 68. Belt 69 is wound around pulleys 66 and 67.

In the apparatus shown in FIG. 7, the torque of motor 68 is transmitted to housing 64 through belt 69, so that prism 65 is rotated by the torque. Thus, laser beam 60 is output from prism 65, being refracted at angle $\theta$.

By employing the apparatus shown in FIG. 7 in place of slit plate 37, laser beam 60 can describe the track shown in FIG. 6.

Figures 8A, 8B:
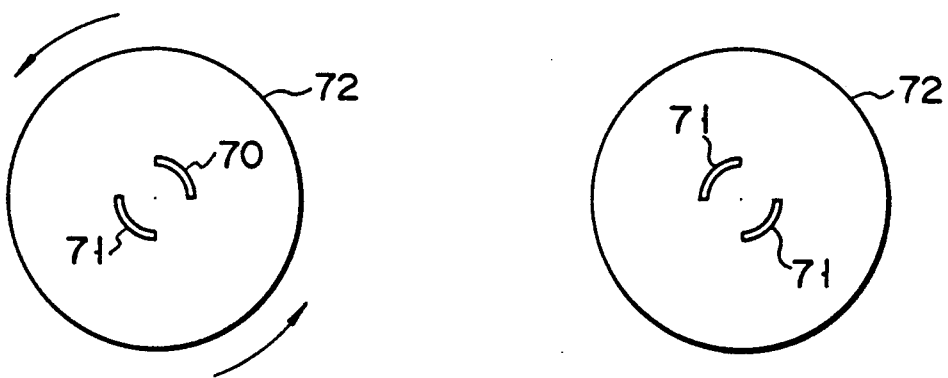
FIG. 8A is a view of a slit plate in which arcuate slits are formed.
FIG. 8B illustrates a state in which the slit plate shown in FIG. 8A has been rotated.

In the above-mentioned embodiment, slit plate 72 shown in FIG. 8 may be employed as a means for producing a ring-like beam. As is shown in FIG. 8, slit plate 72 has a pair of arcuate slits, each of which is about one fourth of a complete circle. During use, slit plate 72 is rotated 90° from the state shown in FIG. 8A to the state shown in FIG. 8B, to thereby produce a ring-like beam.

In the above-mentioned embodiment, white light beam H used as an alignment beam travels through the same optical path as that of the laser beam deflected by beam splitter 34. However, white light beam H can be directed to liquid crystal display 21 through a different optical path to that of the laser beam.

What is claimed is:

1. A method of repairing a liquid crystal display which comprises a common electrode, pixel electrodes facing the common electrode, and a liquid crystal sealed between the common and pixel electrodes, and wherein the liquid crystal contains conductive foreign matter short-circuiting the common and pixel electrodes to each other, said method comprising the step of:

irradiating a pixel electrode with a laser beam such that at least a ring-like region of said pixel electrode which corresponds to a ring line completely surrounding a portion touching the foreign matter is removed by the laser beam, whereby a region of said pixel electrode inside of the ring line region and a region of said pixel electrode outside of the ring line region are electrically insulated from each other.

2. An apparatus for repairing a liquid crystal display having a common electrode and a plurality of pixel electrodes, comprising:

laser oscillating means for generating a laser beam;

alignment beam source means for outputting an alignment beam used for alignment of the laser beam generated from said laser oscillating means;

first optical means for defining a laser beam and the alignment beam in such a manner that the laser beam and the alignment beam have a cross section in the form of a closed loop, wherein said first optical means comprises a slit plate, which includes a glass plate, and a metal layer coated on the glass plate and having a ring slit corresponding to the closed loop;

XY carriage means on which the liquid crystal display is mounted and which is movable in an XY plane;

driving means for driving the liquid crystal display;

second optical means for focusing the laser beam and the alignment beam, the cross sections of which are in the form of a closed loop, on a predetermined portion of the liquid crystal display;

illuminating means for illuminating the liquid crystal display by directing light thereto through the second optical means;

image sensor means for image-picking up the liquid crystal display means through the second optical means, to generate an image signal; and monitoring means for visualizing the image signal supplied from said image sensor means to allow detection of at least one of the pixel electrodes which is in contact with a foreign matter, wherein a region of the pixel electrode which surrounds an electrode portion touching the foreign matter is removed by the laser beam.

3. An apparatus for repairing a liquid crystal display having a common electrode and a plurality of pixel electrodes, comprising:

laser oscillating means for generating a laser beam;

alignment beam source means for outputting an alignment beam used for alignment of the laser beam generated from said laser oscillating means;

first optical means for defining the laser beam and the alignment beam in such a manner that the laser beam and the alignment beam have a cross section in the form of a closed loop, wherein said first optical means includes a plurality of slit plates which have different-diameter ring slits and are selectively employed.

XY carriage means on which the liquid crystal display is mounted and which is movable in an XY plane;

driving means for driving the liquid crystal display;

second optical means for focusing the laser beam and the alignment beam, the cross sections of which are in the form of a closed loop, on a predetermined portion of the liquid crystal display;

illuminating means for illuminating the liquid crystal display by directing light thereto through the second optical means;

image sensor means for image-picking up the liquid crystal display means through the second optical means, to generate an image signal; and monitoring means for visualizing the image signal supplied from said image sensor means to allow detection of at least one of the pixel electrodes which is in contact with a foreign matter, wherein a region of the pixel electrode which surrounds an electrode portion touching the foreign matter is removed by the laser beam.

4. An apparatus for repairing a liquid crystal display having a common electrode and a plurality of pixel electrodes, comprising:

laser oscillating means for generating a laser beam;

alignment beam source means for outputting an alignment beam used for alignment of the laser beam generated from said laser oscillating means;

first optical means for defining the laser beam and the alignment beam in such a manner that the laser beam and the alignment beam have a cross section in the form of a closed loop, wherein said first optical means includes a slit plate having an arcuate slit, and means for rotating the slit plate by a predetermined angle;

XY carriage means on which the liquid crystal display is mounted and which is movable in an XY plane;

driving means for driving the liquid crystal display;

second optical means for focusing the laser beam and the alignment beam, the cross sections of which are in the form of a closed loop, on a predetermined portion of the liquid crystal display;

illuminating means for illuminating the liquid crystal display by directing light thereto through the second optical means;

image sensor means for image-picking up the liquid crystal display means through the second optical means, to generate an image signal; and monitoring means for visualizing the image signal supplied from said image sensor means to allow detection of at least one of the pixel electrodes which is in contact with a foreign matter, wherein a region of the pixel electrode which surrounds an electrode portion touching the foreign matter is removed by the laser beam.

* * * * *

UNITED STATES PATENT AND TRADEMARK OFFICE
CERTIFICATE OF CORRECTION

PATENT NO. : 5,017,755

DATED : May 21, 1991

INVENTOR(S) : Susumu Yahagi et al.

It is certified that error appears in the above-identified patent and that said Letters Patent is hereby corrected as shown below:

On the title page:

The Foreign Application Priority Data is incorrect, should be,

--Oct. 26, 1988  [JP]  Japan ..................63-270203
  Aug. 9, 1989  [JP]  Japan .................1-204757--.

Signed and Sealed this

Second Day of February, 1993

Attest:

STEPHEN G. KUNIN

*Attesting Officer*    Acting Commissioner of Patents and Trademarks